(12) United States Patent
Shimizu et al.

(10) Patent No.: US 12,258,728 B2
(45) Date of Patent: Mar. 25, 2025

(54) REMOTE-CONTROL UNIT AND WORKING VEHICLE

(71) Applicant: TAKEUCHI MFG. CO., LTD., Nagano (JP)

(72) Inventors: Hokuto Shimizu, Nagano (JP); Naoki Jimbo, Nagano (JP); Yuichi Shioiri, Nagano (JP)

(73) Assignee: TAKEUCHI MFG. CO., LTD. (JP)

( * ) Notice: Subject to any disclaimer, the term of this patent is extended or adjusted under 35 U.S.C. 154(b) by 0 days.

(21) Appl. No.: 18/610,403

(22) Filed: Mar. 20, 2024

(65) Prior Publication Data
US 2025/0059723 A1    Feb. 20, 2025

(30) Foreign Application Priority Data
Aug. 17, 2023    (JP) .................................. 2023-133027

(51) Int. Cl.
*E02F 9/20* (2006.01)
*F16F 15/08* (2006.01)
*G05G 1/04* (2006.01)

(52) U.S. Cl.
CPC ............ *E02F 9/2004* (2013.01); *F16F 15/08* (2013.01); *G05G 1/04* (2013.01);
(Continued)

(58) Field of Classification Search
CPC . E02F 9/2004; E02F 9/20; F16F 15/08; F16F 2230/0005; F16F 2234/02;
(Continued)

(56) References Cited

U.S. PATENT DOCUMENTS

| | | | |
|---|---|---|---|
| 3,580,636 A * | 5/1971 | Setto | ........................ G05G 1/62 244/234 |
| 5,338,133 A | 8/1994 | Tornero | |

(Continued)

FOREIGN PATENT DOCUMENTS

| | | | | |
|---|---|---|---|---|
| EP | 1179449 A1 * | 2/2002 | ............. | B60N 2/773 |
| EP | 2308717 A2 * | 4/2011 | ........... | B60N 2/4646 |

(Continued)

OTHER PUBLICATIONS

European Search Report issued in the corresponding European Patent Application No. 24166104.0; dated Sep. 30, 2024 (total 8 pages).

*Primary Examiner* — Keith J Frisby
(74) *Attorney, Agent, or Firm* — Harness, Dickey & Pierce, P.L.C.

(57) ABSTRACT

A remote-control unit is provided that suppresses the generation of "shaking" in a remote-control lever when the remote-control lever is operated. The remote-control unit includes a remote-control lever, a fixed rail, a movable rail, a first support member, and a second support member. The fixed rail and the first support member are fixed to a working vehicle, the movable rail slidably engages with the fixed rail, and is configured to be movable in a direction that the fixed rail is disposed. The first support member supports the second support member by way of a first resin member at a position different from a position on the fixed rail and from a position on an extension of the fixed rail.

5 Claims, 5 Drawing Sheets

(52) U.S. Cl.
CPC ... *F16F 2230/0005* (2013.01); *F16F 2234/02* (2013.01); *Y10T 74/20624* (2015.01)

(58) Field of Classification Search
CPC .......... B60N 2/797; B60N 2/773; G05G 1/04; Y10T 74/20624
USPC ................................ 180/334, 326; 74/473.3
See application file for complete search history.

(56) References Cited

U.S. PATENT DOCUMENTS

| | | | |
|---|---|---|---|
| 5,586,811 A | 12/1996 | Tornero | |
| 5,924,515 A * | 7/1999 | Stauffer | A01D 67/04 180/326 |
| 7,748,785 B2 * | 7/2010 | Lucas | B60N 2/797 297/411.35 |
| 8,039,769 B2 * | 10/2011 | Asp | B66F 17/00 200/334 |
| 8,556,216 B2 * | 10/2013 | Bandera | B64C 13/06 74/519 |
| 9,335,783 B2 * | 5/2016 | Van Olst | A61G 5/04 |
| 10,837,158 B2 * | 11/2020 | Handel | E02F 9/166 |
| 11,274,420 B2 * | 3/2022 | An | E02F 9/2012 |
| 11,591,770 B2 * | 2/2023 | O'Halloran | E02F 9/2004 |
| 2003/0184123 A1 * | 10/2003 | Amamiya | B60N 2/797 296/190.01 |
| 2006/0000656 A1 * | 1/2006 | Bisick | B60N 2/797 180/272 |
| 2006/0042857 A1 * | 3/2006 | Catton | B60N 2/767 180/334 |
| 2007/0017728 A1 * | 1/2007 | Sano | B60N 2/77 180/326 |
| 2007/0085362 A1 * | 4/2007 | Sato | E02F 9/2004 296/24.34 |
| 2007/0145805 A1 * | 6/2007 | Bower | E02F 9/166 296/190.01 |
| 2010/0057307 A1 * | 3/2010 | Copeland | E02F 9/2004 701/50 |
| 2010/0187858 A1 * | 7/2010 | Ekren | B60N 2/773 296/190.01 |
| 2013/0270866 A1 * | 10/2013 | Herzberg | B60K 35/10 296/190.08 |
| 2013/0292200 A1 * | 11/2013 | Herzberg | E01C 19/48 180/326 |
| 2015/0084387 A1 * | 3/2015 | Mori | E02F 9/16 297/217.1 |
| 2020/0317056 A1 * | 10/2020 | Nelson | F16C 29/045 |

FOREIGN PATENT DOCUMENTS

| | | | |
|---|---|---|---|
| EP | 2404781 A1 | | 1/2012 |
| JP | H07-043212 Y | | 6/1990 |
| JP | H0411127 A | * | 1/1992 |
| JP | H0762689 A | * | 3/1995 |
| JP | H10280480 A | * | 10/1998 |
| WO | WO-2019146824 A1 | * | 8/2019 |

* cited by examiner

REMOTE-CONTROL UNIT AND WORKING VEHICLE

CROSS REFERENCE TO RELATED APPLICATIONS

This application claims priority to Japanese Patent Application No. 2023-133027, filed on Aug. 17, 2023, which is expressly incorporated herein by reference in its entirety.

TECHNICAL FIELD

The present invention relates to a remote-control unit and a working vehicle.

BACKGROUND ART

A working vehicle such as a construction machine is operated in accordance with an operation performed by an operator. Among working machines, there exists a working machine that includes a remote-control lever (an operational lever) for operating the working vehicle on both left and right sides of a seat on which the operator is seated or on either one of the left and right sides of the seat. As an example, a working vehicle provided with a console box that has a remote-control lever for operating the working vehicle can be named (see Japanese Utility Model Publication No. 7-43212).

FIG. 9 is a view illustrating one example of a mechanism for moving a console box in a working vehicle according to prior art. In FIG. 9, a console box 903 is disposed on a left side and a right side of a seat not illustrated in the drawing on which an operator is seated. A remote-control lever 904 is mounted on a distal end portion of the console box 903. The remote-control lever 904 is the lever for controlling an operation of the working vehicle that is operated by the operator. The console box 903 is configured to be movable in a longitudinal direction on an upper surface of a support base not illustrated in the drawing by a guide rail mechanism 908. The guide rail mechanism 908 includes: a fixed rail (lower guide rail) 912 that is installed on an upper surface of the support base; and a movable rail (upper guide rail) 913 that is mounted on the lower surface of the console box 903. The fixed rail 912 and the movable rail 913 engage with each other.

In the guide rail mechanism 908 described in the prior art, a lateral width of the fixed rail 912 has a sufficient width corresponding to a lateral width of the console box 903. Accordingly, in sliding the remote-control lever 904, the remote-control lever 904 can be smoothly moved and hence, "shaking" is also minimally generated at the time of operating the remote-control lever 904. However, there exists a technical problem that the lateral width of the console box 903 is wide and hence, the restriction is imposed on the arrangement in a cabin of the working vehicle.

On the other hand, by narrowing the lateral width of the fixed rail 912, the lateral width of the console box 903 can be narrowed. However, when the lateral width of the fixed rail is narrowed, in operating the remote-control lever 904, there is a possibility that "shaking" is generated in the console box 903 in the lateral direction, in the vertical direction, or the rotational direction where the longitudinal direction of the fixed rail is used as an axis of rotation. Further, there also exists a drawback that, when the working vehicle is traveling, the remote-control lever 904 vibrates.

The present invention has been made in view of above-mentioned circumstances, and it is an object of the present invention to provide a remote-control unit that, even in a case where a lateral width of a fixed rail for moving the remote-control unit is narrow, can suppress the occurrence of "shaking" in a remote-control lever when a remote-control lever is operated and can suppress the vibration of the remote-control lever when a working vehicle is traveling.

It is also an object of the present invention to provide a working vehicle provided with a remote-control unit that, even when a lateral width of a fixed rail for moving the remote-control unit is narrow, in operating a remote-control lever, can suppress the occurrence of "shaking", and can suppress the vibration of the remote-control lever when a working vehicle is traveling.

SUMMARY

[1] A remote-control unit according to the present invention is a remote-control unit that includes a remote-control lever for operating a working vehicle, wherein the remote-control unit is characterized in that the remote-control unit includes a fixed rail, a movable rail, a first support member and a second support member, the fixed rail and the first support member are fixed to the working vehicle, the movable rail is configured to allow the remote-control lever to be movable in a direction that the fixed rail is disposed by allowing the movable rail to slidably engage with the fixed rail, and the first support member supports the second support member by way of a first resin member at a position different from a position on the fixed rail and from a position on an extension of the fixed rail.

[2] In the remote-control unit of the present invention, it is preferable that the first support member have a first hole having a circular cross-sectional shape, the second support member have an elongated hole that has a longitudinal direction in a direction that the fixed rail is disposed, the first resin member have a third hole having a circular cross-sectional shape, and the first support member support the second support member by a bolt that is allowed to pass through the first hole, the elongated hole and the third hole.

[3] In the remote-control unit of the present invention, it is preferable that the first resin member have a structure where a first circular sleeve having an outer diameter L1, a second circular sleeve having an outer diameter L2 (a relationship of L1>L2 being set), and a third circular sleeve having the outer diameter L1 be arranged such that a rotational axis of the first circular sleeve, a rotational axis of the second circular sleeve and a rotational axis of the third circular sleeve are aligned with each other, and a recessed portion defined by an outer shape of the first circular sleeve, an outer shape of the second circular sleeve, and an outer shape of the third circular sleeve engage with a peripheral edge of the elongated hole formed in the second support member.

[4] In the remote-control unit according to the present invention, it is preferable that the remote-control unit further include a second resin member, the first support member further include a second hole having a circular cross-sectional shape, the second resin member have a fourth hole having a circular cross-sectional shape, and the first support member support the second support member by way of a bolt that is allowed to pass through the second hole, the elongated hole and the fourth hole.

[5] In the remote-control unit according to the present invention, it is preferable that the first support member have an elongated hole having a longitudinal direction in a direction that the fixed rail is disposed, the second support member have a first hole having a circular cross-sectional shape, the first resin member have a third hole having a circular cross-sectional shape, and the first support member support the second support member by way of a bolt that is allowed to pass through the elongated hole, the first hole and the third hole.

[6] In the remote-control unit according to the present invention, it is preferable that the first resin member have a structure where a first circular sleeve having an outer diameter L1, a second circular sleeve having an outer diameter L2 (a relationship of L1>L2 being set), and a third circular sleeve having the outer diameter L1 are arranged such that a rotational axis of the first circular sleeve, a rotational axis of the second circular sleeve and a rotational axis of the third circular sleeve are aligned with each other, and a recessed portion defined by an outer shape of the first circular sleeve, an outer shape of the second circular sleeve, and an outer shape of the third circular sleeve engage with a peripheral edge of the elongated hole formed in the first support member.

[7] In the remote-control unit according to the present invention, it is preferable that the remote-control unit further include a second resin member, the second support member further include a second hole having a circular cross-sectional shape, the second resin member have a fourth hole having a circular cross-sectional shape, and the first support member support the second support member by way of a bolt that is allowed to pass through the elongated hole, the second hole, and the fourth hole.

[8] A working vehicle according to the present invention is a working vehicle provided with a remote-control unit, wherein the remote-control unit includes a remote-control lever, a fixed rail, a movable rail, a first support member and a second support member, the fixed rail and the first support member are fixed to the working vehicle, the movable rail is configured to allow the remote-control lever to be movable in a direction that the fixed rail is disposed by allowing the movable rail to slidably engage with the fixed rail, and the first support member supports the second support member by way of a resin member at a position different from a position on the fixed rail and from an position on an extension of the fixed rail.

Advantageous Effects of Invention

The remote-control unit according to the present invention includes the fixed rail and the movable rail, and the movable rail can, by slidably engaging with the fixed rail, move the remote-control lever in the direction that the fixed rail is disposed. Further, the remote-control unit includes the first support member and the second support member, and the first support member supports the second support member at the position different from a position on the fixed rail and from a position on the extension of the fixed rail by way of the resin member.

With such a configuration, it is possible to prevent "shaking" of a remote-control lever that can be hardly prevented by a slide mechanism that is constituted of the fixed rail and the movable rail having a narrow width.

That is, according to the present invention, even when the lateral width of the fixed rail that moves the remote-control unit is narrow, it is possible to prevent the occurrence of "shaking" in the remote-control lever when the remote-control lever is operated. Accordingly, it is possible to provide the remote-control unit that can suppress the generation of vibration in the remote-control lever when the working vehicle is traveling.

The working vehicle according to the present invention includes the fixed rail and the movable rail, and the movable rail can, by slidably engaging with the fixed rail, move the remote-control lever in the direction that the fixed rail is disposed. Further, the working vehicle according to the present invention includes the first support member and the second support member, and the first support member supports the second support member at the position different from the position on the fixed rail and on the extension of the fixed rail by way of the resin member.

With such a configuration, it is possible to suppress the occurrence of "shaking" of a remote-control lever that can be hardly prevented by a slide mechanism that is constituted of the fixed rail 110 and the movable rail 210 having a narrow width.

That is, according to the present invention, even when the lateral width of the fixed rail that is included in the slide mechanism is narrow, it is possible to prevent the occurrence of "shaking" in the remote-control lever when the remote-control lever is operated. Accordingly, it is possible to provide the working vehicle that can suppress the generation of vibration in the remote-control lever when the working vehicle is traveling.

DETAILED DESCRIPTION

Mode for carrying out the present invention (hereinafter referred to as "embodiment") is described. The embodiment described hereinafter is the preferred mode for carrying out the invention. However, the embodiment is not intended to limit the invention according to claim. Further, it is not always the case that all various constitutional elements described in the embodiment and all combinations of these constitutional elements are indispensable in the present invention.

1. WORKING VEHICLE

Figure 1:
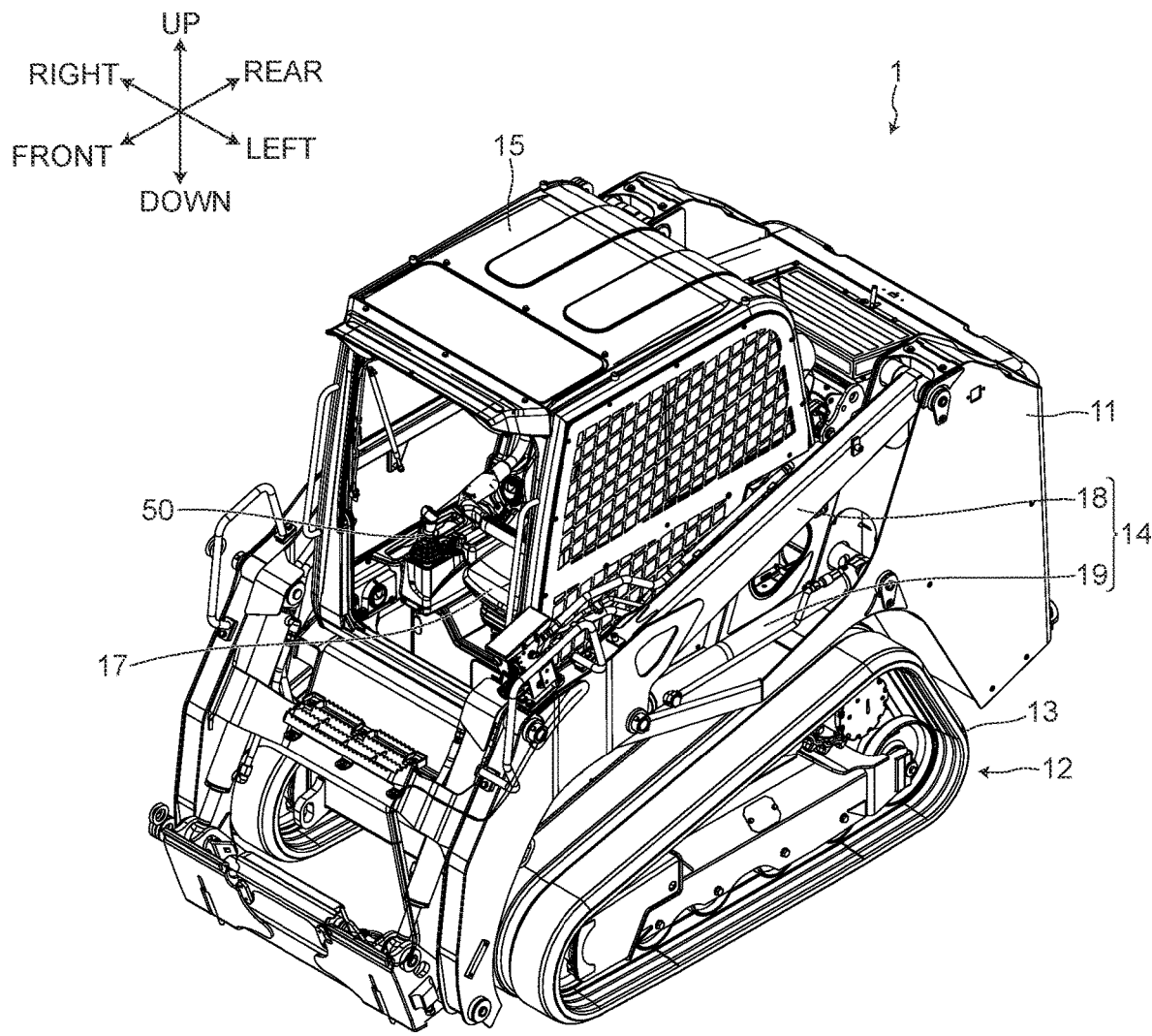
FIG. 1 is a view illustrating a working vehicle 1 according to an embodiment.

FIG. 1 is a view illustrating a working vehicle 1 according to the embodiment. Hereinafter, the description is made by taking "crawler loader" (also referred to as "track loader") capable of mounting a bucket not illustrated in the drawing on a distal end of an arm 18 as an example of the working vehicle 1 according to the embodiment. The external appearance configuration of the working vehicle 1 according to the embodiment does not constitute the gist of the present invention and hence, only the schematic configuration is described.

Further, in the description made hereinafter, as illustrated in FIG. 1, a side on which the bucket is mounted in the working vehicle 1 is assumed as "front", a side opposite to the side on which the bucket is mounted is assumed as "rear", a side of a bottom surface of the working vehicle 1 is assumed as "down", a side opposite to the bottom surface is assumed as "up", a side of a left side surface of the working vehicle 1 when the working vehicle 1 is viewed from behind is assumed as "left", and a side of a right side surface of the working vehicle 1 when the working vehicle 1 is viewed from behind is assumed as "right".

As illustrated in FIG. 1, the working vehicle 1 includes: a body frame 11, a pair of left and right traveling devices 12 mounted on the body frame 11 each having a crawler (track) 13; a working device 14 mounted on a body device; and a cabin 15 mounted on a center upper portion of the body frame 11.

The cabin 15 is formed in a box shape. A front door not illustrated in the drawing that is openable and closable is disposed on a front side of the working vehicle 1. In the cabin 15, an operator seat 17 on which an operator is seated facing a front side of the vehicle is installed. A remote-control unit 50 that includes a remote-control lever 400 (see FIG. 2) is disposed on a left side and/or a right side of the operator seat 17.

The remote-control unit 50 is described in detail later.

With respect to the working vehicle 1, an operator, by seating on the operator seat 17 and by operating the remote-control lever 400, can make the working vehicle 1 travel by driving the traveling devices 12, and can vertically swing the bucket by vertically swinging the arm 18.

The working device 14 includes: the arm 18 that is disposed so as to surround a front side, a rear side, a left side and a right side of the cabin 15; a pair of left and right hydraulic cylinders (arm cylinders) 19 that is mounted in a straddling manner between the body frame 11 and the arm 18; and the bucket mounted on a distal end portion of the arm 18.

2. REMOTE-CONTROL UNIT

Figure 2:
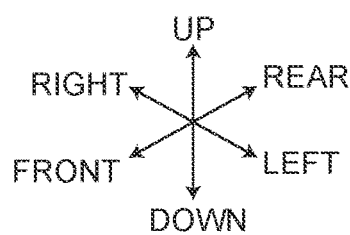
FIG. 2 is a perspective view of a remote-control unit 50 according to the embodiment.
Figure 2:
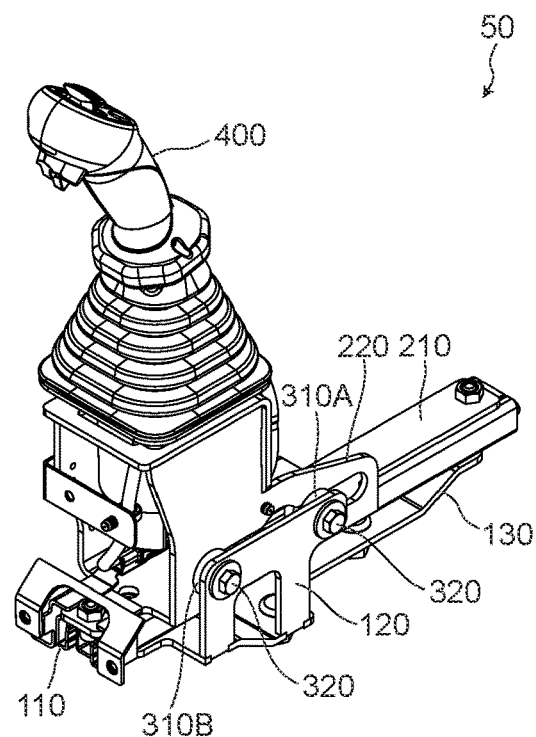
Figure 3:
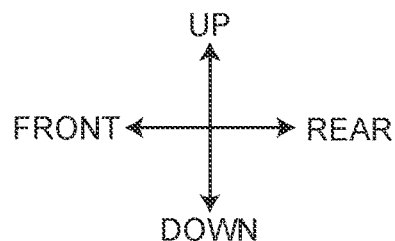
FIG. 3 is a side view of the remote-control unit 50 according to the embodiment.
Figure 3:
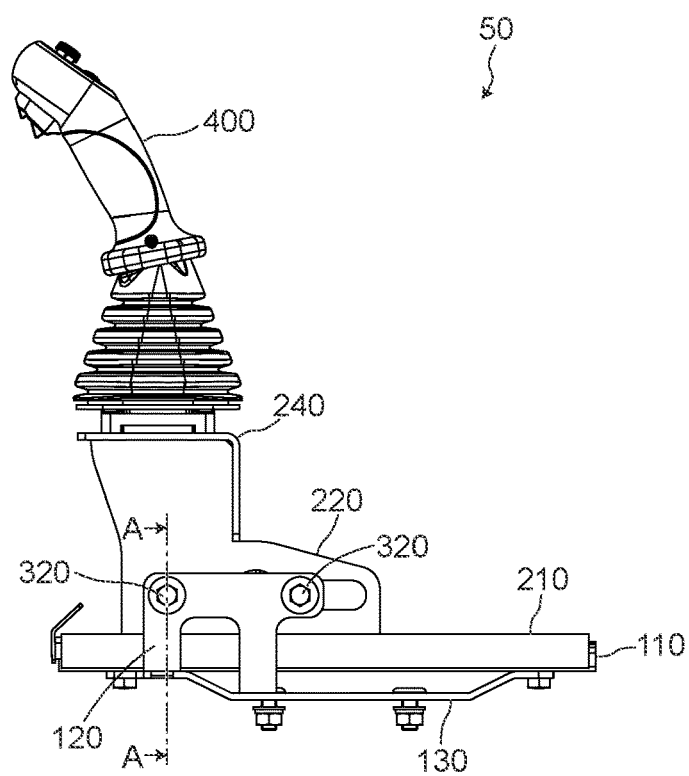
Figure 4:
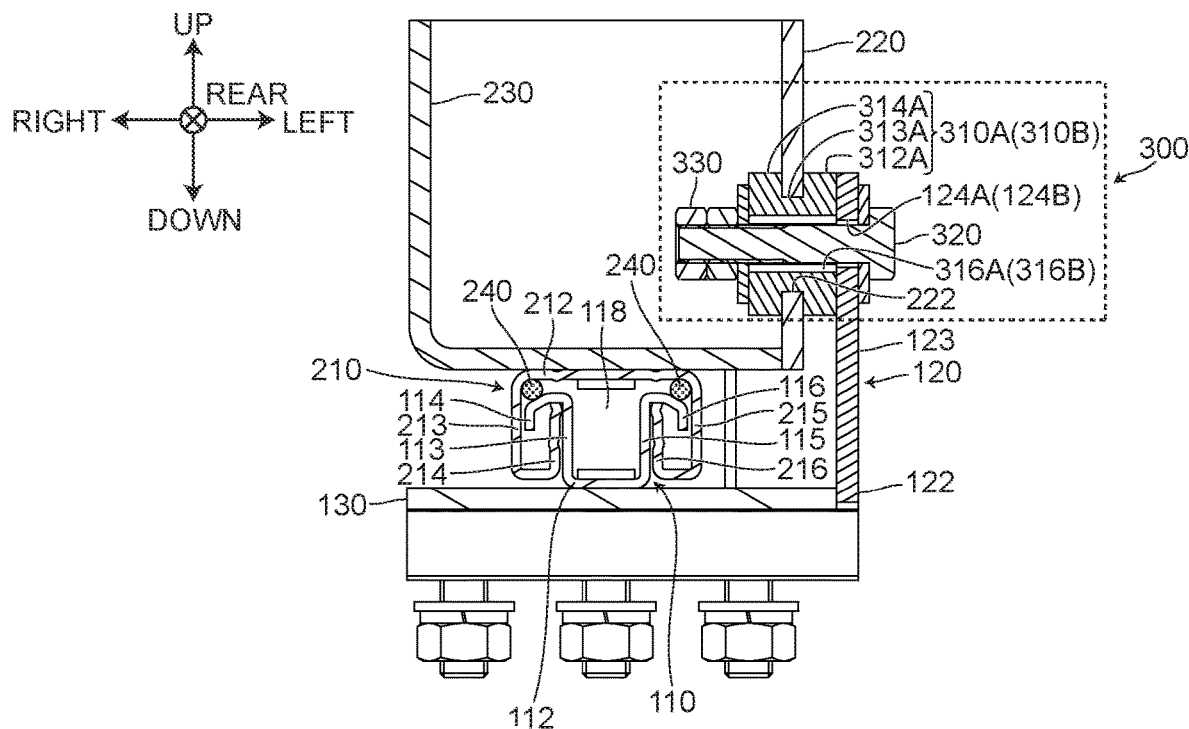
FIG. 4 is a cross-sectional view of the remote-control unit 50 taken along a line A-A in FIG. 3.
Figure 5:
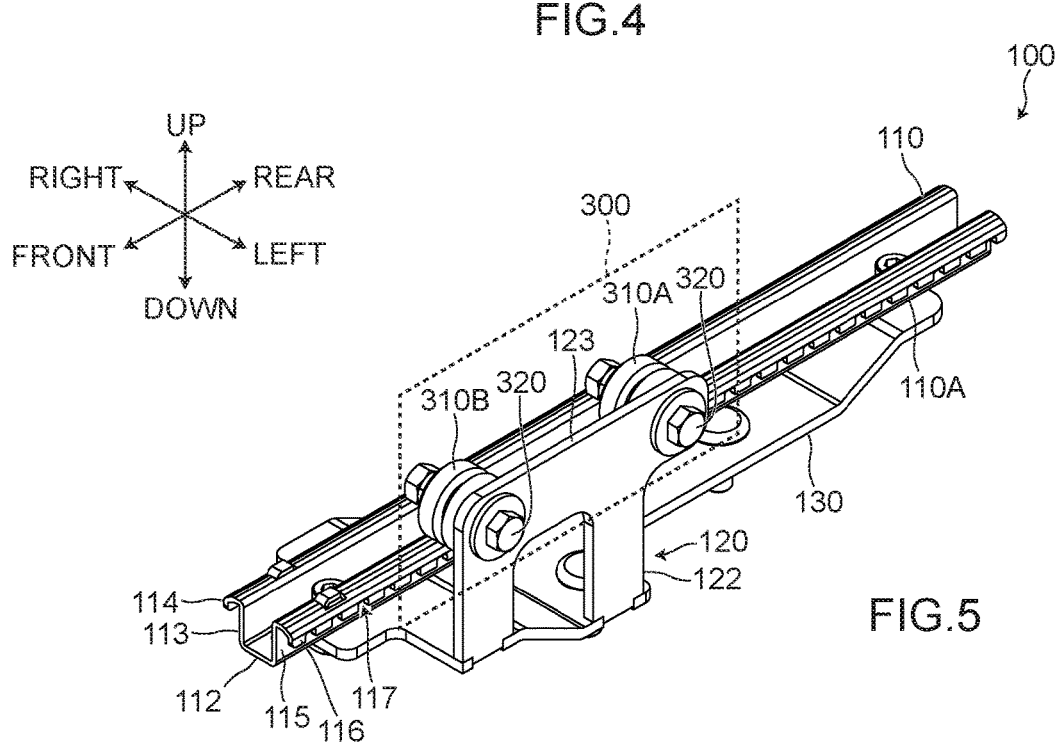
FIG. 5 is a perspective view illustrating a fixed portion 100 of the remote-control unit 50 according to the embodiment.
Figure 6:
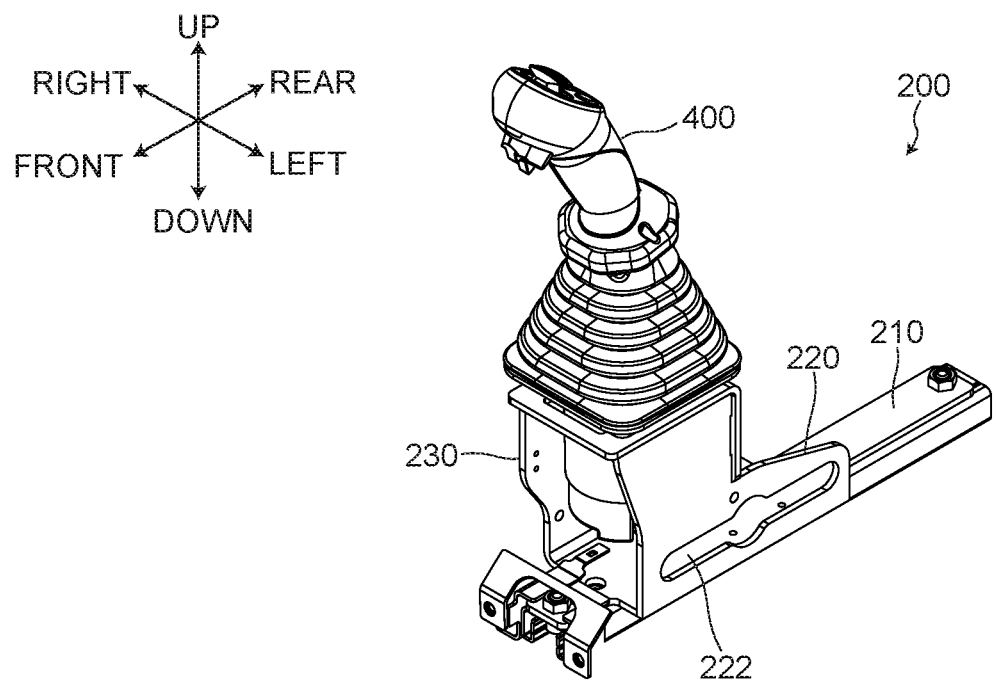
FIG. 6 is a perspective view illustrating a movable portion 200 of the remote-control unit 50 according to the embodiment.
Figure 7:
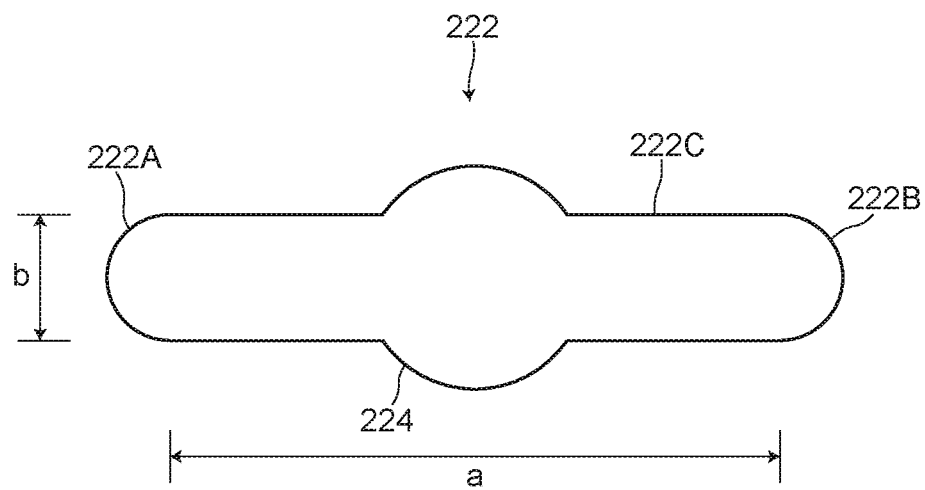
FIG. 7 is a view illustrating an elongated hole 222 formed in the remote-control unit 50 according to the embodiment.

FIG. 2 is a perspective view of the remote-control unit 50 according to the embodiment. FIG. 3 is a side view of the remote-control unit 50 according to the embodiment. FIG. 4 is a cross-sectional view of the remote-control unit 50 taken along a line A-A in FIG. 3. FIG. 5 is a perspective view illustrating a fixed portion 100 of the remote-control unit 50. FIG. 6 is a perspective view illustrating a movable portion 200 of the remote-control unit 50 according to the embodiment. FIG. 7 is a view illustrating an elongated hole 222 formed in the remote-control unit 50 according to the embodiment.

As illustrated in FIG. 2 to FIG. 6, the remote-control unit 50 includes the fixed portion 100, the movable portion 200, a remote-control lever sliding mechanism 300, and the remote-control lever 400. The fixed portion 100 includes a fixed rail 110 and a first support member 120. The movable portion 200 includes a movable rail 210 and a second support member 220.

2-1. Fixed Portion

The fixed rail 110 is fixed to the working vehicle 1. The fixed rail 110 may be directly fixed to the working vehicle 1, or may be indirectly fixed to the working vehicle 1. As an example where the fixed rail 110 is indirectly fixed to the working vehicle 1, as illustrated in FIG. 5, the case is exemplified where the fixed portion 100 has a fixed rail support member 130, the fixed rail 110 is fixed to the fixed rail support member 130, and the fixed rail support member 130 is fixed to the working vehicle 1.

The fixed rail 110 engages with the movable rail 210, and allows the movable rail 210 to slide in a predetermined direction. In this embodiment, the predetermined direction is the direction along which the remote-control lever 400 is made to move. Specifically, the predetermined direction is the longitudinal direction with respect to a seating direction of the operator in the working vehicle 1.

The shape and the like of the fixed rail 110 are not limited provided that the fixed rail 110 allows the movable rail 210 to slide in a predetermined direction. As the shape of the fixed rail 110, for example, a shape illustrated in FIG. 4 and FIG. 5 that can be formed by bending a plate-like member made of metal may be exemplified.

The fixed rail 110 includes: a base portion 112; and a first side portion 113 and a second side portion 115 that are raised upright from the base portion 112. A distal end of the first side portion 113 is bent toward a left side in the drawing and a first folded portion 114 is formed. A distal end of the second side portion 115 is bent toward a right side in the drawing and a second folded portion 116 is formed. An opening 118 is formed between the distal end of the first side portion 113 and the distal end of the second side portion 115.

The engagement configuration between the fixed rail 110 and the movable rail 210 is described later.

As illustrated in FIG. 5, a plurality of grooves 117 are formed on the distal end of the second folded portion 116. By allowing the grooves 117 and pawls (not illustrated in the drawing) that the movable portion 200 includes to engage with each other, the movable portion 200 can be stopped at a predetermined position by engagement. With such a configuration, the remote-control lever 400 that is mounted on the movable portion 200 can be stopped by engagement with respect to the fixed rail 110.

The method for stopping the movable portion 200 with respect to the fixed rail 110 by engagement is not limited to the above-method where the grooves 117 formed on the distal end of the second folded portion 116 engage with the pawls formed on the movable portion 200. Any method can be adopted provided that the movable portion 200 can engage with respect to the fixed rail 110.

The first support member 120 is fixed to the working vehicle 1. The first support member 120 may be directly fixed to the working vehicle 1, or may be indirectly fixed to the working vehicle 1. The first support member 120 according to the embodiment is integrally formed with the fixed rail support member 130, and is directly fixed to the working vehicle 1.

As illustrated in FIG. 4 and FIG. 5, the first support member 120 includes one end portion 122 and the other end portion 123. One end portion 122 of the first support member 120 is fixed to the working vehicle 1, and the other end portion 123 of the first support member 120 supports the second support member 220. The first support member 120 is disposed such that one end portion 122 forms a lower end portion and the other end portion 123 forms an upper end portion 123. Further, the other end portion 123 is disposed at a position higher than a position at which the fixed rail 110 is disposed.

As illustrated in FIG. 4, two holes 124 (herein after, one hole being referred to as "first hole 124A" and the other hole being referred to as "second hole 124B") are formed in the other end portion 123. Two holes 124 allow threaded portions of bolts 320 to pass therethrough, and each have a circular cross-sectional shape. The first hole 124A and the second hole 124B are arranged parallel to the direction that the fixed rail 110 is arranged. The first hole 124A and the second hole 124B function as a constitutional element of a remote-control lever slide mechanism 300 where the first support member 120 supports the second support member 220. The remote-control lever slide mechanism 300 is described in detail.

2-2. Movable Portion

As illustrated in FIG. 4 and FIG. 6, the movable rail 210 is fixed to the movable rail support member 230. As described above, the movable rail 210 slides on the fixed rail 110 by being guided by the fixed rail 110, and moves the movable portion 200 in a predetermined direction. In this embodiment, the predetermined direction is the direction that the remote-control lever 400 moves.

The shape and the like of the movable rail 210 are not limited provided that the movable rail 210 is engageable with the fixed rail 210. As the shape of the movable rail 210, for example, the shape illustrated in FIG. 4 or FIG. 6 that can be formed by bending a plate-like member made of metal can be exemplified.

As illustrated in FIG. 4, the movable rail 210 includes: a base portion 212; and a first side portion 213 and a second side portion 215 that extend downward in a vertical direction from the base portion 212. A distal end of the first side portion 213 is bent thus forming a third side portion 214. A distal end of the second side portion 215 is bent thus forming a fourth side portion 216.

The movable rail 210, for example, engages with the fixed rail 110 in a configuration described hereinafter, and slides with respect to the fixed rail 110.

That is, the first side portion 113 of the fixed rail 110 and the third side portion 214 of the movable rail 210 are brought into contact with each other, and the second side portion 115 of the fixed rail 110 and the fourth side portion 216 of the movable rail 210 are brought into contact with each other. With such a configuration, the first side portion 113 and the second side portion 115 of the fixed rail 110 are sandwiched by the third side portion 214 and the fourth side portion 216 of the movable rail 210 thus restricting the movement of the movable rail 210 in the lateral direction. That is, the fixed rail 110 guides the movable rail 210 in the lateral direction.

Further, the distal end of the third side portion 214 of the movable rail 210 is brought into contact with the first folded portion 114 of the fixed rail 110, and the distal end of the fourth side portion 216 of the movable rail 210 is brought into contact with the second folded portion 116.

Further, the first folded portion 114 of the fixed rail 110 and a portion of the movable rail 210 raised from the base portion 212 to the first side portion 213 are brought into contact with each other by way of a resin member 240 having a circular cylindrical shape or a spherical shape. The second folded portion 116 of the fixed rail 110 and a portion of the movable rail 210 raised from the base portion 212 to the second side portion 215 are brought into contact with each other by way of the resin member 240 having a circular cylindrical shape or a spherical shape. With such a configuration, the movement of the movable rail 210 in the downward direction is restricted. That is, the fixed rail 110 guides the movable rail 210 in the vertical direction.

With respect to the configuration that makes the movable rail 210 and the fixed rail 110 engage with each other, any configuration may be adopted without being limited to the above-mentioned configuration provided that the movable rail 210 is slidable with respect to the fixed rail 110.

As illustrated in FIG. 7, a second support member 220 incudes the elongated hole 222 through which the threaded portion of the bolt 320 passes. The elongated hole 222 functions as a constitutional element of a remote control lever slide mechanism 300. The remote-control lever slide mechanism 300 is described later in detail.

2-3. Remote-Control Lever Slide Mechanism

Figure 8A:
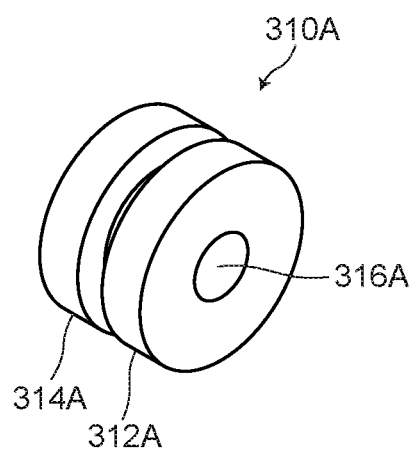
FIGS. 8A, 8B and 8C are views illustrating a first resin member 310A that can be appropriately used in the remote-control unit 50 according to the embodiment.
Figure 8B:
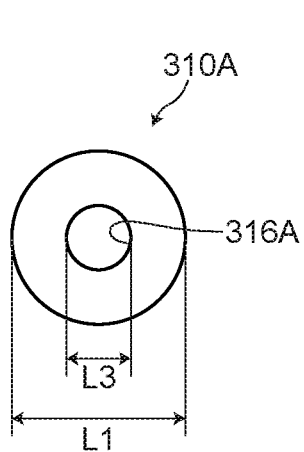
Figure 8C:
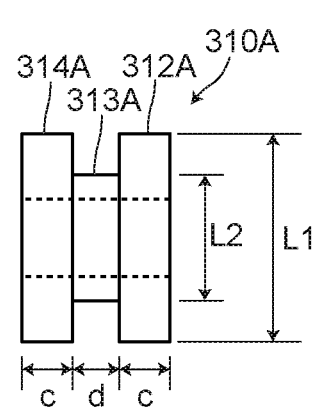
Figure 9:
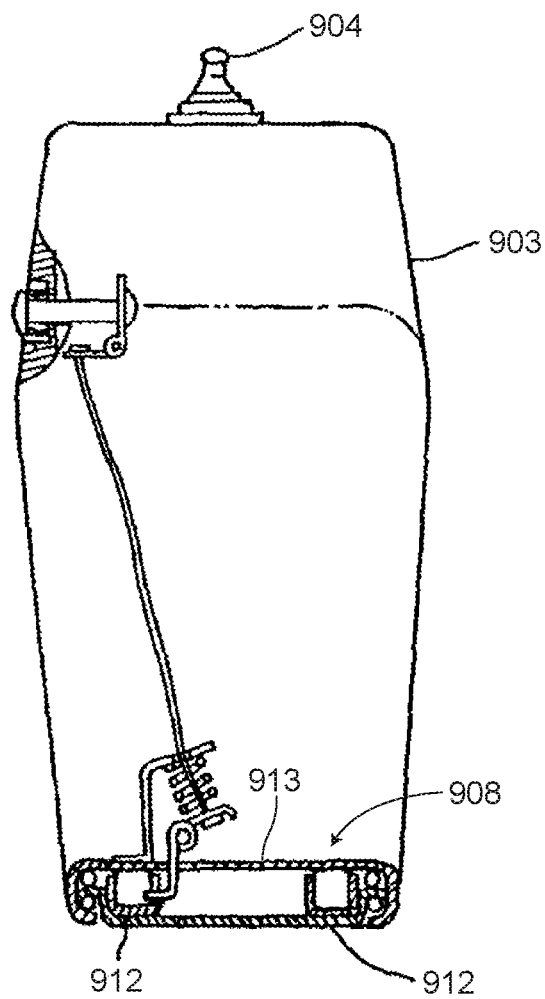
FIG. 9 is a view illustrating one example of a mechanism for moving a console box in a working vehicle according to the prior art.

FIGS. 8A, 8B and 8C are a set of views for illustrating a first resin member 310A that can be preferably used in the remote-control unit 50 according to the embodiment.

The remote-control lever slide mechanism 300 is a mechanism where the first support member 120 supports the second support member 220 slidably in a direction that the fixed rail 110 is disposed. To be more specific, the first support member 120 supports the second support member 220 by way of the first resin member 310A at a position different from the fixed rail 110 and an extension of the fixed rail 110 (see FIG. 4).

The remote-control lever slide mechanism 300 is constituted by including: a first hole 124A that is formed in the first support member 120 and has a circular cross-sectional shape; an elongated hole 222 that is formed in the second support member 220; and a third hole 316A that is formed in the first resin member 310A and has a circular cross-sectional shape. The bolt 320 is inserted into the first hole 124A, the elongated hole 222, and the third hole 316A. The first support member 120, the second support member 220 and the first resin member 310A are fixed to each other by the bolt 320 and nuts 330.

In such a configuration, the bolt 320 is not limited to a member that is generally referred to as "bolt". The bolt widely includes any member that is a rod-like member and can be inserted into the first hole 124A, the elongated hole 222, and the third hole 316A, and supports the second support member 220 by the first support member 120 slidably by being combined with the nut 330 or a part or a member substantially equal to the nut 330. For example, in this embodiment, the bolt 320 also includes: a bolt that is formed of only a threaded portion by removing a head portion of the bolt, a bolt where threads are formed on only a portion of the bolt required for fastening and other portions are formed into a round rod.

As illustrated in FIG. 4, the first resin member 310A is disposed between the first support member 120 and the second support member 220. By allowing the bolt 320 to pass through the first hole 124A, the third hole 316A and the elongated hole 222, the first support member 120 supports the second support member 220 by way of the first resin member 310A.

As illustrated in FIG. 7, the elongated hole 222 is a hole having an opening portion of a shape formed by extending a circular hole in one direction. The elongated hole 222 includes: portions 222A, 222B derived from a circular hole shape formed on both ends thereof; and a parallel hole portion 222C. A length of the parallel hole portion 222C in the longitudinal direction is equal to or longer than a length that the remote-control lever 400 is moved. A length b of the parallel hole portion 222C in the width direction corresponds to a diameter of the circular hole.

A fifth hole 224 having a radius R is joined to a center portion of the elongated hole 222. The fifth hole 224 is described later.

The elongated hole 222 is formed such that a longitudinal direction of the parallel hole portion 222C becomes parallel to a direction along which the fixed rail 110 is disposed. With such a configuration, when the movable portion 200 is moved with respect to the fixed portion 100, the bolt 320 that passes through the first hole 124A can smoothly move in the parallel hole portion 222C.

The elongated hole 222 is formed in the second support member 220 at a position different from the fixed rail 110 and an extension of the fixed rail 110. In a such a configuration, the fixed rail 110 engages with the movable rail 210 and makes the movable rail 210 slide and hence, "a position that differs from the fixed rail 110 and an extension of the fixed rail 110" may be also referred to as "a position that differs from the movable rail 210 and an extension of the movable rail 210"

With such a configuration, the movable portion 200 is supported at two places, that is, the engaging portion between the fixed rail 110 and the movable rail 210 and the position at which the second support member 220 is supported by the first support member 120. As a result, during an operation of the remote-control lever 400, "shaking" in a rotational direction about a rotational axis that is either a lateral direction, a vertical direction or a longitudinal direction of the fixed rail 110 can be effectively suppressed.

Further, the first support member 120 supports the second support member 220 by way of the first resin member 310A. With such a configuration, the second support member 220 can effectively suppress "shaking" generated at the time of operating the remote-control lever 400 and, at the same time, the movable portion 200 can be smoothly moved at the time of moving the movable portion 200 on which the remote-control lever 400 is mounted.

As described in FIGS. 8A, 8B and 8C, the first resin member 310A has the structure where the first circular sleeve 312A, the second circular sleeve 313A and the third circular sleeve 314A are arranged such that the rotational axes of the respective circular sleeves 312A, 313A, 314A agree with each other. The first resin member 310A may be formed as the first resin member 310A that forms one part by integrating the first circular sleeve 312A, the second circular sleeve 313A, and the third circular sleeve 314A. Alternatively, the first circular sleeve 312A, the second circular sleeve 313A, and the third circular sleeve 314A may be incorporated into the remote-control lever slide mechanism 300 as respectively separate parts as it is. Alternatively, only a part, for example, only the first circular sleeve 312A may be incorporated as the first resin member 310A.

Outer diameters of the first circular sleeve 312A, the second circular sleeve 313A, and the third circular sleeve 314A are L1, L2, L1 (L1>L2) respectively.

As illustrated in FIG. 4, FIG. 7 and FIGS. 8A, 8B and 8C, the outer diameter L2 of the second circular sleeve 313A is set substantially equal to a length b of the parallel hole portion 222C of the elongated hole 222 in the width direction. Further, a height (thickness) c of the first circular sleeve 312A is equal to a distance between the first support member 120 and the second support member 220. With such a configuration, a recessed portion that is formed of an outer shape of the first circular sleeve 312A, an outer shape of the second circular sleeve 313A, and an outer shape of the third circular sleeve 314A can engage with a peripheral edge portion of the elongated hole 222 formed in the second support member 220 (see FIG. 4).

With such a configuration, the second support member 220 is supported by the first support member 120 by way of the recessed portion that is formed of outer shapes of the first circular sleeve 312A, the second circular sleeve 313A, and the third circular sleeve 314A. As the result, "shaking" of the remote-control lever 400 in the vertical direction and in the lateral direction, and "shaking" of the remote-control lever 400 in the rotational direction about the rotational axis of the fixed rail 110 in the longitudinal direction can be effectively suppressed. Further, when the movable portion 200 is to be moved, the movable portion 200 can be smoothly moved.

The outer diameter L1 of the first circular sleeve 312A, is set smaller than a diameter of the fifth hole 224 formed in the second support member 220. In a case where the first resin member 310A is manufactured as a part that is an integral body formed of the first circular sleeve 312A, the second circular sleeve 313A, and the third circular sleeve 314A, the first circular sleeve 312A can be assembled through the fifth hole 224 formed in the second support member 220 and hence, the remote-control lever slide mechanism 300 can be assembled.

A diameter L3 of the third hole 316A formed in the first circular sleeve 312A, the second circular sleeve 313A, and the third circular sleeve 314A is formed with substantially the same size in the first circular sleeve 312A, the second circular sleeve 313A, and the third circular sleeve 314A and hence, the diameter L3 is larger than a diameter of a threaded portion of the bolt 320 to be inserted. In this manner, by setting the diameter L3 of the third hole 316A to a size that has a play with respect to the diameter of the threaded portion of the bolt 320, when the first support member 120, the first resin member 310A and the second support member 220 are fastened to each other by the bolt 320, a tolerance for allowing the bolt 320 to pass through these members can be generated. Further, a tolerance for moving the movable portion 200 can be ensured.

In a preferred configuration of the remote-control unit 50, the remote lever slide mechanism 300 further includes a second resin member 310B (see FIG. 5). Further, the first support member 120 supports the second support member 220 by way of the second resin member 310B at a position different from the position on the fixed rail 110 and from the position on the extension of the fixed rail 110.

The remote-control lever slide mechanism 300 includes: a second hole 124B that is formed in the first support member 120 and has a circular cross-sectional shape; a fourth hole 316B that is formed in the second resin member 310B and has a circular cross-sectional shape; and the bolt 320 and the nut 330.

The second hole 124B is disposed on the other end portion 123 of the first support member 120 in the same manner as the first hole 124A. The first hole 124A and the second hole 124B are arranged in parallel in the direction that the fixed rail 110 is disposed.

The second resin member 310B has substantially the same configuration as the first resin member 310A. Accordingly, the description of the second resin member 310B is omitted. The bolt 320 is made to pass through the second hole 124B, the fourth hole 316B and the elongated hole 222, and the second resin member 310B is fixed by the nut 330.

As the preferred configuration of the remote-control unit 50, the first support member 120 supports the second support member 220 also by way of the second resin member 310B in addition to the first resin member 310A. The second resin member 310B is arranged parallel to the first resin member 310A in the direction that the fixed rail 110 is disposed. With such a configuration, "shaking" of the remote-control lever 400 in the longitudinal direction can be suppressed.

The remote-control unit 50 according to the present invention includes the fixed rail 110 and the movable rail 210, and can move the remote-control lever 400 in the direction that the fixed rail 110 is disposed by allowing the movable rail 210 to engage with the fixed rail 110 slidably. Further, the remote-control unit 50 according to the present invention includes the first support member 120 and the second support member 220, and the first support member 120 supports the second support member 220 by way of the first resin member 310A at the position different from the position on the fixed rail 110 and from the position on the extension of the fixed rail 110.

In case of a slide mechanism that is formed of the fixed rail 110 and the movable rail 210 both having a narrow width, it is difficult to prevent "shaking" of the remote-control lever 400. However, with such a configuration, it is possible to prevent such "shaking" of a remote-control lever 400.

The working vehicle 1 according to the present invention includes the fixed rail 110 and the movable rail 210, the remote-control lever 400 can be moved in the direction that the fixed rail 110 is disposed by allowing the movable rail 210 to engage with the fixed rail 110 slidably. Further, the working vehicle 1 according to the present invention includes the first support member 120 and the second support member 220, and the first support member 120 supports the second support member 220 by way of the first resin member 310A at the position different from the position on the fixed rail 110 and from the position on the extension of the fixed rail 110.

Although "shaking" of the remote-control lever 400 has been difficult to suppress in the slide mechanism that is constituted of the fixed rail 110 and the movable rail 210 both having a narrow lateral width, with such a configuration, such "shaking" of the remote-control lever 400 can be suppressed.

That is, according to the present invention, even in a case where the lateral width of the fixed rail 110 that is included in the slide mechanism for moving the remote-control lever 400 is narrow, when the remote-control lever 400 is operated, it is possible to suppress the generation of "shaking" in the remote-control lever 400. Accordingly, it is possible to provide the working vehicle 1 that can suppress the vibration of the remote-control lever 400 when the working vehicle 1 is traveling.

3. MODIFICATION

Next, a remote-control unit according to a modification is described. The remote-control unit according to the modification differs from the remote-control unit 50 according to the embodiment with respect to a point that a first support member 120 has an elongated hole in place of a first hole 124A, and a second support member 220 has a circular hole in place of the elongated hole 222. Hereinafter, the remote-control unit according to the modification is described.

The remote-control unit according to the modification has a remote-control lever slide mechanism 300. The remote-control lever slide mechanism 300 is configured to include an elongated hole formed in the first support member 120; a first hole formed in the second support member 220 and having a circular cross-sectional shape; and a third hole 316A formed in the first resin member 310A and having a circular cross-sectional shape. A bolt 320 is allowed to pass through the elongated hole, the first hole and the third hole 316A, and the first support member 120, the second support member 220 and the first resin member 310A are fixed to each other by the bolt 320 and nuts 330.

The elongated hole is formed such that a longitudinal direction of a parallel hole portion becomes parallel to the direction that the fixed rail 110 is arranged. With such a configuration, the first support member 120 can support the second support member 220 by way of the first resin member 310A.

The first resin member 310A has the structure where the first circular sleeve 312A, the second circular sleeve 313A and the third circular sleeve 314A are arranged such that a rotational axis of the first circular sleeve 312A, a rotational axis of the second circular sleeve 313A and a rotational axis of the third circular sleeve 314A are aligned with each other. In this modification, outer diameters of the first circular sleeve 312A, the second circular sleeve 313A and the third circular sleeve 314A are respectively L1, L2, L1 (L1>L2).

The outer diameter L2 of the second circular sleeve 313A is set substantially equal to the length b of the parallel hole portion of the elongated hole in the width direction. Further, the height (the thickness) c of the first circular sleeve 312A (or the third circular sleeve 314A) is equal to a distance between the first support member 120 and the second support member 220. With such a configuration, a recessed portion that is defined by the outer shape of the first circular sleeve 312A, the outer shape of the second circular sleeve 313A and the outer shape of the third circular sleeve 314A engages with a peripheral edge portion of the elongated hole formed in the first support member 120.

With such a configuration, the second support member 220 is supported by the first support member 120 by way of the recessed portion that is defined by the outer shape of the first circular sleeve 312A, the outer shape of the second circular sleeve 313A and the outer shape of the third circular sleeve 314A. As a result, "shaking" of the remote-control lever 400 in the vertical direction and in the lateral direction, and "shaking" of the remote-control lever 400 in the rotational direction about the rotational axis in the longitudinal direction of the fixed rail 110 can be effectively suppressed. Further, when the moving portion 200 is moved, the moving portion 200 can be moved smoothly.

The remote-control lever slide mechanism 300 of the remote-control unit further includes a second resin member 310B. Further, the first support member 120 supports the second support member 220 by way of the second resin member 310B at a position different from the fixed rail 110 and an extension of the fixed rail 110.

The remote-control lever slide mechanism 300 includes: a second hole that is formed in the second support member 220 and has a circular cross-sectional shape; and a fourth hole 316B that is formed in the second resin member 310B and has a circular cross-sectional shape: and the bolt 320 and the nuts 330.

The second hole is, in the same manner as the first hole, disposed on the second support member 220. The first hole and the second hole are arranged parallel to each other in the direction that the fixed rail 110 is disposed.

The second resin member 310B has substantially the same configuration as the first resin member 310A. The bolt 320 is allowed to pass through the second hole, the fourth hole 316B and the elongated hole, and the second resin member 310B is fixed by the nut 330.

Also, in the modification of the remote-control unit, the first support member 120 supports the second support member 220 by way of the second resin member 310B in addition to the first resin member 310A. The second resin member 310B is arranged parallel to the first resin member 310A in the direction that the fixed rail 110 is disposed. With such a configuration, "shaking" in the longitudinal direction of the remote-control lever 400 can be suppressed.

The invention claimed is:

1. A remote-control unit including a remote-control lever for operating a working vehicle, wherein
the remote-control unit includes a fixed rail, a movable rail, a first support member and a second support member,
the fixed rail and the first support member are fixed to the working vehicle,
the movable rail is configured to allow the remote-control lever to be movable in a direction that the fixed rail is disposed by allowing the movable rail to slidably engage with the fixed rail, and
the first support member supports the second support member by way of a first resin member at a position different from a position on the fixed rail and from a position on an extension of the fixed rail.

2. The remote-control unit according to claim 1, wherein
the first support member has a first hole having a circular cross-sectional shape,
the second support member has an elongated hole that has a longitudinal direction in a direction that the fixed rail is disposed,
the first resin member has a third hole having a circular cross-sectional shape, and
the first support member supports the second support member by way of a bolt that is allowed to pass through the first hole, the elongated hole and the third hole.

3. The remote-control unit according to claim 2, wherein
the first resin member has a structure where a first circular sleeve having an outer diameter L1, a second circular sleeve having an outer diameter L2, L1>L2, and a third circular sleeve having the outer diameter L1 are arranged such that a rotational axis of the first circular sleeve, a rotational axis of the second circular sleeve and a rotational axis of the third circular sleeve are aligned with each other, and
a recessed portion defined by an outer shape of the first circular sleeve, an outer shape of the second circular sleeve, and an outer shape of the third circular sleeve engages with a peripheral edge of the elongated hole formed in the second support member.

4. The remote-control unit according to claim 2, wherein
the remote-control unit further includes a second resin member,
the first support member further includes a second hole having a circular cross-sectional shape,
the second resin member has a fourth hole having a circular cross-sectional shape, and
the first support member supports the second support member by way of a bolt that is allowed to pass through the second hole, the elongated hole and the fourth hole.

5. A working vehicle provided with a remote-control unit, wherein
the remote-control unit includes a remote-control lever for operating the working vehicle,
a fixed rail, a movable rail, a first support member and a second support member,
the fixed rail and the first support member are fixed to the working vehicle,
the movable rail is configured to allow the remote-control lever to be movable in a direction that the fixed rail is disposed by allowing the movable rail to slidably engage with the fixed rail, and
the first support member supports the second support member by way of a resin member at a position different from a position on the fixed rail and from a position on an extension of the fixed rail.

* * * * *